(12) United States Patent
Jonn et al.

(10) Patent No.: US 7,318,937 B2
(45) Date of Patent: Jan. 15, 2008

(54) LIQUID COATING COMPOSITIONS

(75) Inventors: Jerry Y. Jonn, Raleigh, NC (US); Brian McCrum, Raleigh, NC (US); Wendy Su, Raleigh, NC (US); Teresa Warren, Raleigh, NC (US); Ibraheem T. Badejo, Raleigh, NC (US)

(73) Assignee: Closure Medical Corporation, Raleigh, NC (US)

( * ) Notice: Subject to any disclaimer, the term of this patent is extended or adjusted under 35 U.S.C. 154(b) by 272 days.

(21) Appl. No.: 11/084,326

(22) Filed: Mar. 18, 2005

(65) Prior Publication Data
US 2006/0211820 A1 Sep. 21, 2006

(51) Int. Cl.
*A61K 47/32* (2006.01)

(52) U.S. Cl. .................. 424/487; 524/268; 524/474; 526/279

(58) Field of Classification Search ............... None
See application file for complete search history.

(56) References Cited

U.S. PATENT DOCUMENTS

| 4,987,893 | A | | 1/1991 | Salamone et al. |
| 5,103,812 | A | | 4/1992 | Salamone et al. |
| 5,387,417 | A | * | 2/1995 | Rentsch ............... 424/401 |
| 6,358,503 | B1 | | 3/2002 | Gerrish |
| 6,383,502 | B1 | * | 5/2002 | Dunshee et al. ......... 424/401 |
| 6,482,441 | B1 | * | 11/2002 | Hasegawa et al. ....... 424/490 |
| 2004/0235683 | A1 | * | 11/2004 | Moffett ................. 508/202 |

* cited by examiner

*Primary Examiner*—Marc S. Zimmer

(57) ABSTRACT

Liquid coating compositions are provided that comprise siloxane containing polymer, volatile polydimethylsiloxane, and aliphatic hydrocarbon. The liquid coating compositions preferably comprise from 18-55 weight % of volatile polydimethylsiloxane, from 5-55 weight % of aliphatic hydrocarbon, from 1-40 weight % of siloxane containing polymer, and from 0-15 weight % of adjuvant.

34 Claims, No Drawings

LIQUID COATING COMPOSITIONS

FIELD

The invention generally relates to liquid coating compositions that comprise siloxane containing polymer, volatile polydimethylsiloxane, and aliphatic hydrocarbon.

BACKGROUND

Various liquid coating compositions are known. For example, U.S. Pat. Nos. 4,987,893 and 5,103,812 both relate to combinations of alkyl siloxy siloxane-containing polymers admixed with liquid polydimethylsiloxanes. The combinations are described as excellent non-stinging, non-irritating liquid coating material for forming films which act as conformable bandages adhering to and protecting nails, skin and mucous membrane wounds from abrasion, contamination, and desiccation, while stopping pain from exposed nerve ends and allowing body fluid evaporation.

U.S. Pat. No. 6,383,502 relates to compositions comprising 1-40% siloxane containing polymer; 60-99% of an alkane-based siloxy polymer reaction solvent, and 0-15% of adjuvants. The compositions are described as being useful for application to the skin or as components in cosmetic or topical medicament compositions.

SUMMARY

In one aspect, a liquid coating composition is provided that comprises (a) 1-40 weight % of siloxane containing polymer; (b) 18-55 weight % of volatile polydimethylsiloxane; (c) 5-55 weight % of aliphatic hydrocarbon; and (d) 0-15 weight % of adjuvant.

In another aspect, a liquid coating composition is provided that comprises (a) 1-40 weight % of siloxane containing polymer; (b) 20-55 weight % of volatile polydimethylsiloxane; (c) 15-55 weight % of aliphatic hydrocarbon; and (d) 0-15 weight % of adjuvant.

In yet another aspect, a liquid coating composition is provided that comprises (a) 1-40 weight % of siloxane containing polymer; (b) 25-50 weight % of volatile polydimethylsiloxane; (c) 20-50 weight % of aliphatic hydrocarbon; and (d) 0-15 weight % of adjuvant.

In a further aspect, a liquid coating composition is provided that comprises (a) 1-40 weight % of siloxane containing polymer; (b) 25-45 weight % of volatile polydimethylsiloxane; (c) 20-45 weight % of aliphatic hydrocarbon; and (d) 0-15 weight % of adjuvant.

In yet a further aspect, a liquid coating composition is provided that comprises (a) 1-40 weight % of siloxane containing polymer; (b) 30-40 weight % of volatile polydimethylsiloxane; (c) 30-40 weight % of aliphatic hydrocarbon; and (d) 0-15 weight % of adjuvant.

In yet another aspect, a liquid coating composition is provided that comprises (a) 1-40 weight % of siloxane containing polymer; (b) 30-40 weight % of hexamethyldisiloxane; (c) 30-40 weight % of isooctane; and (d) 0-15 weight % of adjuvant. The composition includes an adjuvant comprising a plasticizer.

DETAILED DESCRIPTION

The invention relates to liquid coating compositions that comprise siloxane containing polymer, volatile polydimethylsiloxane, and aliphatic hydrocarbon. As explained herein, the liquid coating compositions are useful for protecting or treating skin, nails, and mucous membranes of a user as the liquid coating compositions, when applied to skin, nails, and/or mucous membranes of a user, dry to form a coating or film. The liquid coating compositions are preferably in the form of solutions.

The liquid coating compositions preferably comprise from 18-55 weight (wt.) % of volatile polydimethylsiloxane, from 5-55 wt. % of aliphatic hydrocarbon, from 1-40 wt. % of siloxane containing polymer, and from 0-15 wt. % of adjuvant. In some embodiments, the liquid coating compositions comprise from 20-55 wt. % of volatile polydimethylsiloxane, from 15-55 wt. % of aliphatic hydrocarbon, from 1-40 wt. % of siloxane containing polymer, and from 0-15 wt. % of adjuvant. In other embodiments, the liquid coating compositions comprise from 25-50 wt. % of volatile polydimethylsiloxane, from 20-50 wt. % of aliphatic hydrocarbon, from 1-40 wt. % of siloxane containing polymer, and from 0-15 wt. % of adjuvant. In further embodiments, the liquid coating compositions comprise from 25-45 wt. % of volatile polydimethylsiloxane, from 20-45 wt. % of aliphatic hydrocarbon, from 1-40 wt. % of siloxane containing polymer, and from 0-15 wt. % of adjuvant. In yet further embodiments, the liquid coating compositions comprise from 30-40 wt. % of volatile polydimethylsiloxane, from 30-40 wt. % of aliphatic hydrocarbon, from 1-40 wt. % of siloxane containing polymer, and from 0-15 wt. % of adjuvant. In any of these embodiments, the siloxane containing polymer may be present in the composition from 5-40 wt. %, 10-30 wt. %, or 15-25 wt. %, and the adjuvant may be present in the composition from 0.01-10 wt. %, 0.1-8 wt. %, or 1-6 wt. %. In the various embodiments, the volatile polydimethylsiloxane, aliphatic hydrocarbon, siloxane containing polymer, and optional adjuvant are chosen to form 100 wt. % of the liquid coating compositions.

The volatile polydimethylsiloxane of the liquid coating compositions may be any polydimethylsiloxane including, but not limited to, hexamethyl disiloxane (HMDS), octamethyl cyclotetrasiloxane, decamethyl cyclopentasiloxane, octamethyl trisiloxane, and mixtures of polydimethylsiloxanes. The preferred polydimethylsiloxane used in the compositions is HMDS.

The aliphatic hydrocarbon of the liquid coating compositions may be any aliphatic hydrocarbon, including an alkane, a mixture of alkanes, an alkene, a mixture of alkenes, an alkyne, a mixture of alkynes, or a mixture thereof. The aliphatic hydrocarbon is preferably an alkane such as pentane, isooctane, or a mixture of alkanes. The aliphatic hydrocarbon is more preferably isooctane.

The siloxane containing polymer of the liquid coating compositions may be a siloxane containing polymer as described in U.S. Pat. Nos. 6,383,502, 5,103,812, and 4,987,893, which are hereby incorporated in their entirety by reference herein. As described in the patents, the siloxane containing polymers may comprise vinyl containing alkylsiloxysilanes alone or as co-, ter- or multi-component polymers which can include other polymerizable monomers that do not make the polymers hydrophilic. Typical vinylalkylsiloxysilanes that may be utilized are:
3-methacryloyloxypropyltris(trimethylsiloxy)silane (TRIS);
3-methacryloyloxypropylpentamethyldisiloxane;
3-methacryloyloxypropylbis(trimethylsiloxy)methylsilane;
3-acryloyloxypropylmethylbis(trimethylsiloxy)silane;
3-acryloyloxypropyltris(trimethylsiloxy)silane; and others.

Typical addition polymerizable monomers which may be reacted with the vinylalkylsiloxysilanes to form multi component siloxane containing polymers are: acrylates including, but not limited to, methyl methacrylate, methyl acrylate, tetrahydrofurfuryl methacrylate, cyclohexyl acrylate, tetrahydrofurfuryl acrylate, n-lauryl acrylate, n-lauryl methacrylate, 2-phenoxyethyl acrylate, 2-phenoxyethyl methacrylate, isodecyl acrylate, isodecyl methacrylate, isooctyl acrylate, isooctyl methacrylate, isobornyl acrylate, isobornyl methacrylate, benzyl methacrylate, 2-butoxyethyl acrylate, n-butyl acrylate, n-butyl methacrylate, ethyl acrylate, ethyl methacrylate, dimethyl itaconate, di-n butyl itaconate, 2-ethylhexyl acrylate, 2-ethylhexyl methacrylate, furfuryl methacrylate, n-hexyl acrylate, n-hexyl methacrylate, isobutyl acrylate, isobutyl methacrylate, isopropyl methacrylate, n-octadecyl acrylate, n-octadecyl methacrylate, 2-phenylethyl methacrylate, and n-tridecyl methacrylate; and other polymerizable monomers including, but not limited to, alpha methyl styrene, styrene, p-t-butyl styrene, 4-methoxystyrene, vinyl benzoate, vinyl naphthalene. In addition, fluorinated siloxanes, fluorinated itaconates, fluorinated methacrylates or acrylates, such as hexafluoroisopropyl methacrylate, may be used. Any hydrophobic polymerizable monomer may be used as long as the resulting copolymer has desired $O_2$ and $H_2O$ vapor permeability. These additional polymerizable comonomers may be present in the siloxane containing polymer in amounts up to 0.85 mole fraction.

The siloxane containing polymers are preferably in proportions between about 15-100 mole % vinylalkylsiloxysilane, which component maintains the desired compatibility of the polymer in the volatile polydimethylsiloxane and aliphatic hydrocarbon, provides high moisture and oxygen permeability, and provides biocompatibility. A range of 20 to 40 mole % of the vinylalkylsiloxysilane in the polymer is preferred. Other addition polymerizable monomers may be copolymerized with the vinylalkylsiloxysilanes between about 0-85% mole of the polymer composition to adjust permeability, adhesion, toughness, elasticity, temperature stability, and impact resistance, among other film qualities.

The siloxane containing polymers are preferably at least partially soluble in the volatile polydimethylsiloxane and aliphatic hydrocarbon solvent system of the liquid coating compositions, and are more preferably completely soluble in the volatile polydimethylsiloxane and aliphatic hydrocarbon solvent system of the liquid coating compositions.

The siloxane containing polymers may be linear, branched, or slightly cross-linked and can be homo, co-, ter- or multi polymers. They may be random copolymers or segmental in nature.

Typical vinylalkylsiloxysilane monomers that may be used in forming the siloxane containing polymer include those having the following formulas:

Where $R^1$=H, $CH_3$, or $CH_2COOR'$,
Where $R^2$=alkyl ($C_1$-$C_4$) or $CH_2CH(OH)CH_2$,
Where $R^3$, $R^4$, $R^5$=OSi(Y)$_3$, or alkyl ($C_1$-$C_6$),
Wherein, at least one of $R^3$, $R^4$, $R^5$=OSi(Y)$_3$
Where Y=alkyl ($C_1$-$C_6$), OSi(Z)$_3$ or $R_2OOC(R^1)C$=$CH_2$,
Where Z=alkyl ($C_1$-$C_6$) or aryl, and
Where $R'$=$R^2SiR^3R^4R^5$.

The siloxane containing polymers may have molecular weights from 50,000 to several million. The preferred molecular weight range is 50,000 to 500,000 weight average molecular weight. Lower molecular weight siloxane containing polymers have notably higher solubility in the solvents and solvent systems and hence, while they can be film formers, they generally are slow to dry and remain tacky. The molecular weight of the siloxane containing polymers may be controlled by varying initiator, initiator concentration, reaction temperature, reaction solvent, and/or reaction method.

Preferably, the siloxane containing polymers are acrylate or methacrylate terpolymers having an "A" monomer component that is a silane derivative, a "B" monomer component that when provided as a homopolymer would prepare a "hard" polymer, and a "C" monomer component that, when provided as a homopolymer would prepare a "soft" polymer. This mix of monomers provides the ability to adjust mole fraction ratios to optimize oxygen permeability, ductility, moisture vapor transmissibility of the film and cost of materials. Highly durable coatings are particularly desired to enable the coating to remain on the skin for an extended time and to provide superior protection.

For the "A" monomer, examples of the silane derivatives are as described above. "B" monomers are "hard" where the corresponding homopolymer typically has a glass transition temperature ($T_g$) of more than about −5° C. Examples of such monomers are acrylate or methacrylate monomers, preferably $C_1$-$C_4$ alkyl methacrylates. Most preferably, the hard monomer is methyl methacrylate. Other examples of monomers that may be used for the hard monomer component are monomers having the requisite $T_g$ values including methacrylates having a structure other than delineated above, such as benzyl methacrylate and isobornyl methacrylate methacrylamide such as N-t-butylmethacrylamide; acrylates such as isobornyl acrylate; acrylamides such as N-butylacrylamide and N-t-butylacrylamide; diesters of unsaturated dicarboxylic acids such as diethyl itaconate and diethyl fumarate; vinyl nitrites such acrylonitrile and methacrylonitrile; vinyl esters such as vinyl acetate and vinyl propionate; and monomers containing an aromatic ring such as styrene; α-methyl styrene and vinyl toluene.

"C" monomers may be selected from monomers that form soft homopolymers. "Soft" monomers are monomers where the corresponding homopolymer typically has a $T_g$ of less than about 10° C., provided that the hard monomer has a higher $T_g$ than the soft monomer in each polymer. Such monomers may be $C_4$-$C_{12}$ alkyl acrylates and $C_6$-$C_{12}$ alkyl methacrylates, wherein the alkyl groups are straight, branched, or cyclic. Most preferably, the soft monomer is selected from $C_7$-$C_{10}$ straight chain alkyl acrylates. Other examples of monomers that may be used for the soft monomer component are monomers having the requisite $T_g$ values including dienes, such as butadiene and isoprene; acrylamides, such as N-octylacrylamide; vinyl ethers such as butoxyethylene, propyloxyethylene and octyl oxyethylene; vinyl halides, such as 1,1-dichloroethylene; and vinyl esters such as vinyl caprate and vinyl laurate.

Most preferably, the siloxane-containing polymer comprises about 50 to 60 weight percent A monomer, 25-45 weight percent B monomer, and about 3 to 20 weight percent of C monomer. A specifically preferred embodiment is where the siloxane-containing polymer comprises about 50 to 60 weight percent of 3-methacryloxypropyl tris(trimethylsiloxy)silane, about 25 to 45 weight percent methyl methacrylate, and about 3 to 20 weight percent of a monomer selected from $C_7$-$C_{10}$ straight chain or branched alkyl acylates.

One variation in selection of monomers to be used in siloxane containing polymer is using more than one monomer within each category A, B, or C. For example, the polymer may comprise 57% 3-methacryloyloxypropyl tris (trimethylsiloxy)silane, 39% methyl methacrylate, 2% isooctyl acrylate and 2% decyl acrylate. The last two monomers each satisfy the definition of the C monomer, and together provide the desired quantity of this component.

Any free radical initiator may be used in forming the siloxane containing polymers including azobisisobutyronitrile; 2,2'-azobis(2,4 dimethylpentane nitrile); 2,2'-azobis-(2-methylbutane nitrile); potassium persulfate; ammonium persulfate; benzoyl peroxide; 2,5-dimethyl 2,5-bis(2-ethylhexanoylperoxy)hexane; and the like. The polymerization may be carried out by solution, emulsion, or suspension techniques. The polymers may be formed in solvents such as volatile polydimethylsiloxane, aliphatic hydrocarbons (e.g., alkanes), other solvents, or combinations thereof.

The adjuvant of the liquid coating composition may be one or more plasticizers, polar solvents (e.g., isopropyl alcohol), medicaments or other active agents, adhesion promoters, rheology additives, colorants, masking agents, other adjuvants, and mixtures thereof. In some embodiments, an adjuvant that does not include polar solvents is present in the liquid coating compositions.

Medicaments and other active agents that may be used as an adjuvant include, but are not limited to, antiseptic agents (e.g., benzalkonium chloride), anti-microbial agents, anti-fungal agents, anti-itch agents, anti-bacterial agents, antivirals, antitumor agents, blood pressure regulators, heart regulators, other active agents, and combinations thereof. Other types of active agents that may be desirable to incorporate include plant growth regulators, DEET, citronella oil, plant insecticides, UV and IR absorbers, etc. When a medicament or other active agent (e.g., an antiseptic agent such as benzalkonium chloride) is included in the liquid coating compositions, the medicament or other active agent is typically present in the compositions at 0.01-5.00 wt. %, although higher or lower amounts of medicaments and active agents may be used in the compositions.

The liquid coating compositions preferably contain a plasticizer as an adjuvant to provide flexibility to the film deposited on the skin. Plasticizers used as the adjuvant may include acetyl tributyl citrate, acetyl triethyl citrate, tributyl citrate, triethyl citrate, acetyl tripropyl citrate, tripropyl citrate, dibutyl sebacate, acetyl dibutyl sebacate, dipropyl sebacate, acetyl dipropyl sebacate, diethyl sebacate, acetyl diethyl sebacate, other plasticizers, and mixtures thereof. Other plasticizers may be used, including homologues and derivatives of these esters. When the liquid coating compositions include a plasticizer, the plasticizer is typically present in the composition at 1-3 wt. %, preferably at 1.60-2.25 wt. %, although higher or lower amounts of plasticizer may be used in the compositions.

Other typical plasticizer/adhesion promoters are dibutylphthalate, sucrose acetate isobutyrate, sucrose benzoate, mineral oil, decamethyl cyclopentasiloxane, octamethyl cyclotetrasiloxane, butyl glycolate, and others. Typical rheology additives that may be utilized are fumed silica, such as Cab-o-sil® fumed silica, bentonite and other clay derivatives, and saturated fatty acids, such as hydrated ricinoleic acid.

Coloring or masking agents that may be used as an adjuvant include dyes and pigments.

In one embodiment, the liquid coating compositions include an adjuvant comprising a plasticizer, a medicament or other active agent (e.g., an antiseptic agent such as benzalkonium chloride), and optionally a polar solvent. The optional polar solvent may be useful for dissolving the medicament or other active agent for formulation in the liquid coating composition. The polar solvents, when present, are preferably present in the composition at 1-3 wt. %, more preferably 1.2-3.0 wt. %, although more or less of the polar solvents may be used.

In a preferred embodiment, the adjuvant of the liquid coating compositions comprises a plasticizer that is present in the composition at 1-3 wt. %, more preferably at 1.60-2.25 wt. %; an antiseptic such as benzalkonium chloride that is present in the composition at 0.10-0.15 wt. %; and a polar solvent such as isopropanol that is present in the composition at 1-3 wt. %, more preferably 1.2-3.0 wt %. In such embodiments, the antiseptic may be dissolved in the polar solvent for formulation in the liquid coating compositions.

The liquid coating compositions, when applied to skin, nails, and/or mucous membranes of a user, dry to form a coating or film. The coatings or films may be useful for protecting or treating skin, nails, and mucous membranes (e.g., skin cuts, abrasions, incisions and blisters; dry cracked skin; abraded gums and other oral surfaces; hemorrhoids and abraded body areas; inflamed digestive tract; other mucosal membrane incisions and wounds). The films formed from the liquid coating composition may act as conformable bandages adhering to and protecting nails, skin and mucous membrane wounds from abrasion, contamination, and desiccation, as the liquid coating compositions may provide for a fast drying, flexible, waterproof, breathable, non-stinging liquid adhesive coating or bandage.

When medicaments or other active agents are included in the liquid coating compositions, the coatings formed by the compositions may be used to administer the medicaments or other active agents to the targeted site.

The liquid coating compositions preferably act at room temperature (20° C.) when applied to skin, nails, and/or mucous membranes of a user to form films, preferably in minutes or less. The films are preferably conformable and comfortable and may be elastic and flexible. The films preferably do not irritate the skin and mucous membrane when sprayed or deposited in any way during application and in use after drying. The bandages are preferably substantially painless and easily removable substantially without pain. The dried bandages formed from the liquid coating compositions are also preferably substantially non-water sensitive and waterproof and preferably have high water vapor and oxygen gas transmission therethrough. The bandages preferably form when applied over surfaces wet with water, blood or body fluids, in short times at standard room temperature and reasonable variants thereof. The liquid composition and/or dried polymer film may have various medicaments or other agents incorporated therein for maintaining sterility and/or for release to the underlying area of the body of a user.

The liquid coating compositions may be applied to the skin, nails, mucous membranes, etc. in liquid form by utilization of an applicator, such as a brush, rod, finger, sponge, cloth, dropper, etc; in spray or mist form; or any other usable technique for applying a liquid to a surface. Preferably, the liquid coating compositions are non-stinging.

Medicaments and other active agents may be incorporated into the liquid or solid, dried film bandages for ready or continual release as the bandages formed from the liquid coating compositions may provide an inert, longlasting, highly permeable film that may contain medicaments or other active agents to be applied to the skin, mucous membranes and other body areas on which it is desired to release the active agent over an extended period of time.

The liquid coating compositions may be used for applications other than medical body care. For instance, the coating could be used as a water repellent, yet $H_2O$ vapor permeable, film applied to sanitary napkins, diapers, or panties. With the incorporation of fungicides, the coating could be used to cover grout in tiled surfaces. The liquid coating compositions may further be useful as a sunscreen with the incorporation of UV absorbers. Still other uses include forming films for use in eliminating chapped lips, treating skin and internal body surfaces, and providing protection to skin and other surfaces which may be medicated prior to application.

As discussed above, the siloxane containing polymer may be manufactured in one or more of the solvents used in the final formulation of the liquid coating compositions, in other solvents, and/or in combinations thereof. The liquid coating composition may be formulated by using the siloxane containing polymer in the mixture in which it was manufactured or by isolating the polymer from the mixture in which it was manufactured and then formulating the liquid coating composition. The liquid coating compositions may be formulated, e.g., by mixing the siloxane containing polymer (with or without the solvent in which it was manufactured), the volatile polydimethylsiloxane, the aliphatic hydrocarbon, and the optional adjuvant. In embodiments where the siloxane containing polymer is manufactured in volatile polydimethylsiloxane and/or aliphatic hydrocarbon, it may not be necessary to add more of such solvent(s) when formulating the liquid coating composition.

EXAMPLES

The invention will be further explained by the following illustrative examples that are intended to be non-limiting.

Example 1

Synthesis of Polymer

A 1 L resin flask with overhead stirrer, $N_2$ outlet, condenser and thermocouple under a nitrogen atmosphere was charged with 455 mL of isooctane, 111.3 g (0.263 mol) of methacryloxypropyl tris(trimethylsiloxy)silane (TRIS), 81.9 g (0.818 mol) of methyl methacrylate, 16.8 g (0.091 mol) of isooctyl acrylate and 0.315 g of VAZO®-67 free radical initiator (obtained from DuPont). The reaction mixture was heated to 75° C. and held at that temperature for 24 hours. During the hold at 75° C., two additional amounts of 0.153 g of VAZO®-67 free radical initiator dissolved in 8 g of isooctane were added to the reaction mixture at 12 hours and at 18 hours, respectively. After the 24 hours at 75° C., the reaction mixture was heated to 100° C. and maintained at 100° C. for 6 hours, for a total reaction time of 30 hours. The reaction mixture was then cooled to room temperature. The reaction produced a solution with a siloxane containing polymer.

Example 2

Formulation of Siloxane Containing Polymer as Liquid Coating Composition 8.7 g of hexamethyldisiloxane (HMDS) was added to a flask containing 23.7 g (63.3% solid) of siloxane containing polymer prepared in Example 1. 64.4 g of diluent (HMDS: isooctane 50:50 wt/wt) was added to the flask and the mixture was stirred at room temperature. 1.6 g of dibutyl sebacate was added and the mixture was stirred until it dissolved. The resulting liquid adhesive coating composition contained 15% siloxane containing polymer solid.

Example 3

Formulation of Siloxane Containing Polymer as Liquid Coating Composition with Bioactive Agent 8.7 g of hexamethyldisiloxane (HMDS) was added to a flask containing 23.7 g (63.3% solid) of siloxane containing polymer prepared in Example 1. 64.4 g of diluent (HMDS: isooctane 50:50 wt/wt) was added to the flask and the mixture was stirred at room temperature. 0.106 g of benzalkonium chloride dissolved in 1.5 g of isopropanol and 1.6 g of dibutyl sebacate were added to the flask and the mixture was stirred until complete dissolution and clarity. The resulting liquid adhesive coating composition contained 15% siloxane containing polymer solid and 0.1% antiseptic agent.

While the invention has been described in detail and with reference to specific embodiments thereof, it will be apparent to one skilled in the art that various changes and modifications can be made without departing from the spirit and scope of the invention.

What is claimed is:

1. A liquid coating composition comprising:
    (a) 1-40 weight % of siloxane containing polymer;
    (b) 20-55 weight % of volatile polydimethylsiloxane;
    (c) 15-55 weight % of aliphatic hydrocarbon; and
    (d) 0-15 weight % of adjuvant wherein the siloxane-containing polymer has units derived from at least one vinylalkylsiloxysilane.

2. The composition of claim 1, wherein the volatile polydimethylsiloxane is selected from the group consisting of hexamethyldisiloxane, octamethyl cyclotetrasiloxane, decamethyl cyclopentasiloxane, octamethyl trisiloxane, and mixtures thereof.

3. The composition of claim 2, wherein the volatile polydimethylsiloxane is hexamethyldisiloxane.

4. The composition of claim 1, wherein the aliphatic hydrocarbon is selected from the group consisting of alkane, alkene, alkyne, and mixtures thereof.

5. A liquid coating composition comprising:
    (a) 1-40 weight % of siloxane containing polymer;
    (b) 18-55 weight % of volatile polydimethylsiloxane;
    (c) 5-55 weight % of aliphatic hydrocarbon; and
    (d) 0-15 weight % of adjuvant,
    wherein the aliphatic hydrocarbon is an alkane selected from the group consisting of pentane, isooctane, and mixtures thereof.

6. The composition of claim 5, wherein the alkane is isooctane.

7. The composition of claim 1, wherein the adjuvant is selected from the group consisting of plasticizers, antiseptics, polar solvents, anti-microbial agents, anti-fungal agents, anti-itch agents, anti-bacterial agents, antivirals, antitumor agents, adhesion promoters, rheology additives, colorants, masking agents, and mixtures thereof.

8. A liquid coating composition comprising:
    (a) 1-40 weight % of siloxane containing polymer;
    (b) 18-55 weight % of volatile polydimethylsiloxane;
    (c) 5-55 weight % of aliphatic hydrocarbon; and
    (d) 0-15 weight % of adjuvant,
    wherein the siloxane containing polymer has units derived from an A monomer component that is a silane derivative, a B monomer component that forms a hard polymer when polymerized as a homopolymer, and a C monomer component that forms a soft polymer when polymerized as a homopolymer.

9. The composition of claim 8, wherein the siloxane containing polymer includes units derived from about 50 to 60 weight % of the A monomer, about 25 to 45 weight % of the B monomer, and about 3 to 20 weight % of the C monomer.

10. The composition of claim 9, wherein the A monomer is 3-methacryloyloxypropyl tris(trimethylsiloxy)silane, the B monomer is methyl methacrylate, and the C monomer is isooctyl acrylate.

11. A liquid coating composition comprising:
(a) 1-40 weight % of siloxane containing polymer;
(b) 25-50 weight % of volatile polydimethylsiloxane;
(c) 20-50 weight % of aliphatic hydrocarbon; and
(d) 0-15 weight % of adjuvant.

12. The composition of claim 11, wherein the volatile polydimethylsiloxane is hexamethyldisiloxane.

13. The composition of claim 11, wherein the aliphatic hydrocarbon is isooctane.

14. The composition of claim 11, wherein the siloxane containing polymer includes units derived from about 50 to 60 weight % of 3-methacryloyloxypropyl tris(trimethylsiloxy)silane, about 25 to 45 weight % of methyl methacrylate, and about 3 to 20 weight % of isooctyl acrylate.

15. The composition of claim 11, wherein the adjuvant is selected from the group consisting of plasticizers, antiseptics, polar solvents, anti-microbial agents, anti-fungal agents, anti-itch agents, anti-bacterial agents, antivirals, antitumor agents, adhesion promoters, rheology additives, colorants, masking agents, and mixtures thereof.

16. The composition of claim 11, wherein the volatile polydimethylsiloxane is hexamethyldisiloxane and the aliphatic hydrocarbon is isooctane.

17. The composition of claim 16, wherein the siloxane containing polymer includes units derived from about 50 to 60 weight % of 3-methacryloyloxypropyl tris(trimethylsiloxy)silane, about 25 to 45 weight % of methyl methacrylate, and about 3 to 20 weight % of the isooctyl acrylate.

18. The composition of claim 11, wherein the composition includes 25-45 weight % of volatile polydimethylsiloxane and 20-45 weight % of aliphatic hydrocarbon.

19. The composition of claim 18, wherein:
the volatile polydimethylsiloxane is hexamethyldisiloxane;
the aliphatic hydrocarbon is isooctane; and
the siloxane containing polymer includes units derived from about 50 to 60 weight % of 3-methacryloyloxypropyl tris(trimethylsiloxy)silane, about 25 to 45 weight % of methyl methacrylate, and about 3 to 20 weight % of isooctyl acrylate.

20. A liquid coating composition comprising:
(a) 1-40 weight % of siloxane containing polymer;
(b) 30-40 weight % of volatile polydimethylsiloxane;
(c) 30-40 weight % of aliphatic hydrocarbon; and
(d) 0-15 weight % of adjuvant.

21. The composition of claim 20, wherein the volatile polydimethylsiloxane is hexamethyldisiloxane.

22. The composition of claim 20, wherein the aliphatic hydrocarbon is isooctane.

23. The composition of claim 20, wherein the siloxane containing polymer includes units derived from about 50 to 60 weight % of 3-methacryloyloxypropyl tris(trimethylsiloxy)silane, about 25 to 45 weight % of methyl methacrylate, and about 3 to 20 weight % of isooctyl acrylate.

24. The composition of claim 20, wherein the adjuvant is selected from the group consisting of plasticizers, antiseptics, polar solvents, anti-microbial agents, anti-fungal agents, anti-itch agents, anti-bacterial agents, antivirals, antitumor agents, adhesion promoters, rheology additives, colorants, masking agents, and mixtures thereof.

25. The composition of claim 20, wherein:
the volatile polydimethylsiloxane is hexamethyldisiloxane;
the aliphatic hydrocarbon is isooctane; and
the siloxane containing polymer includes units derived from about 50 to 60 weight % of 3-methacryloyloxypropyl tris(trimethylsiloxy)silane, about 25 to 45 weight % of methyl methacrylate, and about 3 to 20 weight % of isooctyl acrylate.

26. A liquid coating composition comprising:
(a) 1-40 weight % of siloxane containing polymer;
(b) 30-40 weight % of hexamethyldisiloxane;
(c) 30-40 weight % of isooctane; and
(d) 0-15 weight % of adjuvant,
wherein the composition includes an adjuvant comprising a plasticizer.

27. The composition of claim 26, wherein the adjuvant of the composition further comprises an antiseptic and a polar solvent.

28. The composition of claim 26, wherein the plasticizer is present in the composition at 1-3 weight %.

29. The composition of claim 27, wherein the antiseptic is benzalkonium chloride and the polar solvent is isopropanol.

30. The composition of claim 27, wherein the antiseptic is present in the composition at 0.10-0.15 weight %.

31. The composition of claim 30, wherein the polar solvent is present in the composition at 1-3 weight %.

32. The composition of claim 26, wherein:
the adjuvant of the composition further comprises an antiseptic and a polar solvent,
the plasticizer is present in the composition at 1-3 weight %,
the antiseptic is present in the composition at 0.10-0.15 weight %, and
the polar solvent is present in the composition at 1-3 weight %.

33. The composition of claim 32, wherein the composition is in the form of a solution.

34. The composition of claim 26, wherein the siloxane containing polymer includes units derived from about 50 to 60 weight % of 3-methacryloyloxypropyl tris(trimethylsiloxy)silane, about 25 to 45 weight % of methyl methacrylate, and about 3 to 20 weight % of isooctyl acrylate.

* * * * *